United States Patent [19]

Kitner

[11] Patent Number: 4,815,756
[45] Date of Patent: Mar. 28, 1989

[54] TERRAIN VEHICLE STABILIZER

[76] Inventor: William M. Kitner, 4425 Palos Verdes Dr., North Rolling Hills Estates, Calif. 90274

[21] Appl. No.: 162,116

[22] Filed: Feb. 29, 1988

[51] Int. Cl.⁴ ............................................. B60R 27/00
[52] U.S. Cl. ................................... 280/755; 180/215; 280/293
[58] Field of Search ............... 280/748, 755, 756, 760, 280/289.6, 293; 188/5; 180/90.6, 215

[56] References Cited

U.S. PATENT DOCUMENTS

| | | | |
|---|---|---|---|
| 2,767,995 | 10/1956 | Stout | 280/755 |
| 4,154,452 | 5/1979 | Newman | 280/293 |
| 4,190,260 | 2/1980 | Pearce | 280/755 |
| 4,515,392 | 5/1985 | Torras | 188/5 |
| 4,728,121 | 3/1988 | Graves | 280/748 |

Primary Examiner—David M. Mitchell
Assistant Examiner—Ross Weaver
Attorney, Agent, or Firm—Albert O. Cota

[57] ABSTRACT

A stabilizer for all terrain vehicles which has a mounting bracket (20) attached to the undercarriage to which an outrigger spring (22) or (22a) is mounted at a forward angle. A rear spring (30) extends aft of the vehicle in similar manner. Stabilizer arms (26) and (32) are juxtapositionly attached to the springs and act as snubbers, allowing limited deflection of the springs. A folded runner section 23 or a pair of outrigger feet (28), having an upwardly tapering end are integral or attached to the outrigger springs and a cross bar (34) is fastened to the rear spring providing an extended footprint capable of holding the weight of the vehicle. The spring or springs are so located as to change the center of gravity preventing the overturning of the vehicle while yieldingly absorbing the load if an obstruction is encountered.

10 Claims, 3 Drawing Sheets

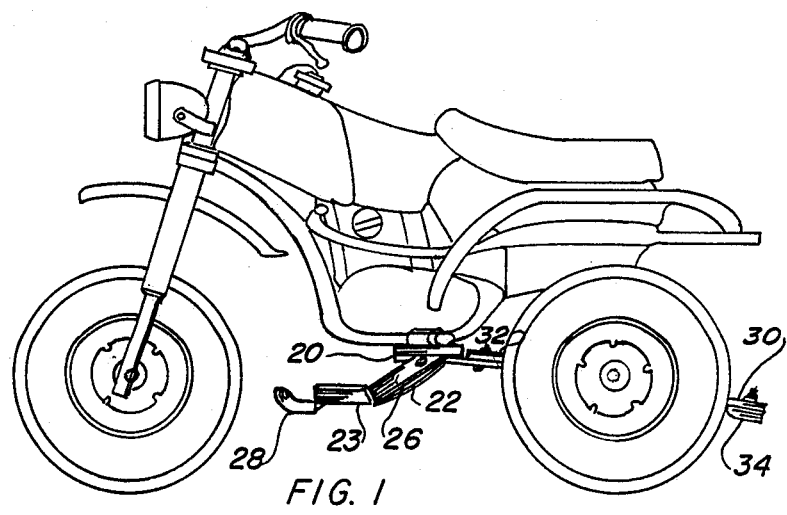
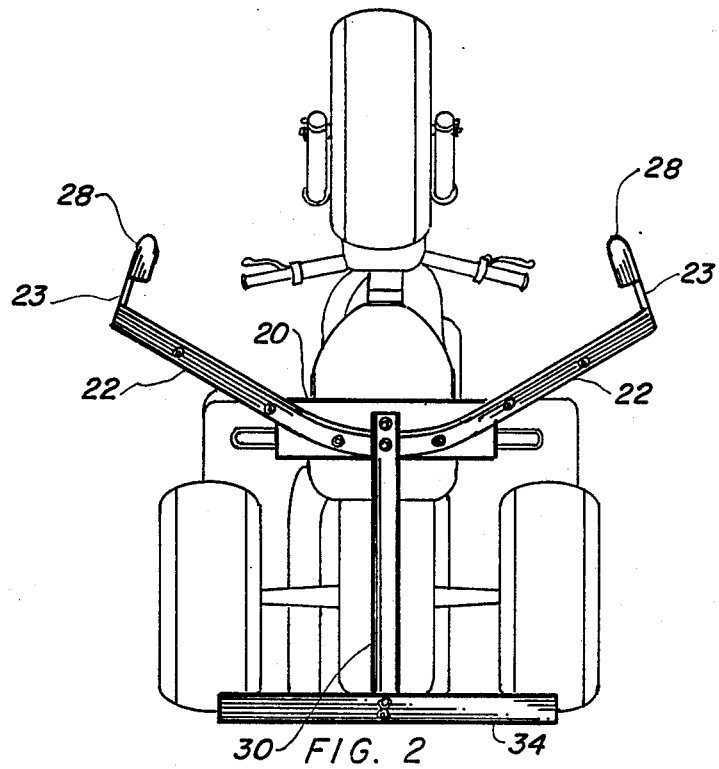

TERRAIN VEHICLE STABILIZER

TECHNICAL FIELD

The present invention relates to stabilizers in general, more particularly to prevention of overturning of a three-wheeled vehicle using resilient outriggers protruding beyond the vehicles existing center of gravity.

BACKGROUND ART

Prior art has attempted to solve the problem of overturning of vehicles, such as tractors, or trucks, by either moving the center of gravity to a position in front of the rear axle increasing the maximum angle of attack or adding a lateral arm to the rear. Vehicles having booms for lifting weight have similar problems of stability when an overhanging load is present. The approach taken by prior art has been to add a stabilizing arm that is extended outward from the vehicle in a rigid manner changing the center of gravity of the entire vehicle relative to the overhanging load.

Cutler in U.S. Pat. No. 3,876,226 issued Apr. 8, 1975 teaches such an attachment of transverse arms to a vehicle. The specification discloses a subassembly for attaching an extending arm to a mower, or the like, having at least one axle carrying road wheels. The assembly is mounted to the chassis and/or body and transfers at least part of the vertical loads indirectly to the axle by the springs and subsequently transferring the overturning moment produced by the arm directly to the axle. The object of this invention is to provide mounting means for a lateral arm that automatically maintains the vehicles relative level despite the widely varying overturning moments applied due to the different working positions of the arm and the intermittent support given by the ground.

Torras in U.S. Pat. No. 4,515,392 issued on May 7, 1985 discloses a device for a tractor or similar vehicle intended for operation along sloping paths, such as hills, embankments, etc., particularly tractors used for mowing highway right-of-way areas. These tractors have sufficient power to traverse slopes beyond the angle of attack and are protected from overturning by the addition of a rigid tail plate mounted behind the rear axle of the vehicle contacting the travel path, limiting the maximum amount of tipping so that the front end of the vehicle can rise no more than a limited amount.

DISCLOSURE OF THE INVENTION

It is seen that prior art has used stabilizing arms for preventing or limiting tipping of a vehicle. While the principle accomplishes the purpose, specific problems still exist in vehicles used for recreation that have been particularly designed to off-road operation over so-called all terrain. In particular the three-wheeled type with large cleeted tires have had great success in traversing all types of terrain, however, the stability has been so lacking that government regulations have prevented their sale to protect the public. Large quantities of these three-wheeled off-road devices, known in the trade as all terrain vehicles (ATV)'s are still in operation and the invention is directed to this type of conveyance.

It is, therefore, a primary object of the invention to provide a stabilizer that will prevent the vehicle from turning over when the angle of attack exceeds the center of gravity while not affecting the operativity and safety of the ATV during normal operation.

An important object of the invention is provided by a resilient outrigger that contains a leaf type spring that has sufficient strength to resist the turning moment and yet yields under controlled limits to allow rocks and boulders to be easily traversed without obstruction by simply riding over the top thereof. A snubber limits the travel of the spring and also has sufficient integrity by itself to withstand the loads encountered. With this arrangement, resiliency is gained during the initial deflection of the stabilizer and when the full weight is placed on the member, the snubber takes over providing the rigidity required to protect the ATV before the critical angle of attack is reached.

Another object of the invention is to stabilize a three-wheeled ATV against overturning and yet allow two-wheeled operation for maneuvering. As an example, the three-wheeled device would rest on a combination of the two wheels plus the stabilizer in a balanced position on flat ground. It will be noted that complete overturning from this position would require considerable force to lift the entire weight well above the outrigger which is beyond the limitations of the wheelbase of the vehicle itself.

Still another object of the invention allows adaptability to not only three-wheeled ATV's, but also the four-wheeled type presently in production. The four-wheel type do not possess the instability in the forward quadrant of operation as the three-wheel type where the triangular shape of the vehicle footprint places the center of gravity at a point much closer to the handlebars than the drive wheels. The weakness of the four-wheeled type is in the rear where steep hills are encountered the tendency of flipping over backwards is still a problem. The rear stabilizer of this invention prevents this from happening as the same principles are involved.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment installed on a three-wheeled all terrain vehicle.

FIG. 2 is a bottom view of the preferred embodiment as above.

BEST MODE FOR CARRYING OUT THE INVENTION

The best mode for carrying out the invention is presented in terms of a preferred, a second and a third embodiment. All embodiments are primarily designed in a similar manner except the second embodiment employs two separate springs and feet and the third embodiment simply utilizes the rear stabilizer without the outriggers.

The preferred embodiment, as shown in FIGS. 1 through 4, is comprised of a mounting bracket 20, rectangular in shape, located under the frame of the ATV acting as a mechanical extension of the undercarriage on either side transverse of the vehicles longitudinal centerline. The bracket 20 is formed of steel, aluminum, or any substance having sufficient structural integrity for supporting the entire weight of the vehicles when bearing upon either side. The bracket 20 may be a solid plate, cast metal with reinforcing gussets, or formed in channel shape with legs either upward or downward. In any event, the stiffness of the bracket is important as it is cantilevered outward from the mainframe of the vehicle.

Figure 3:
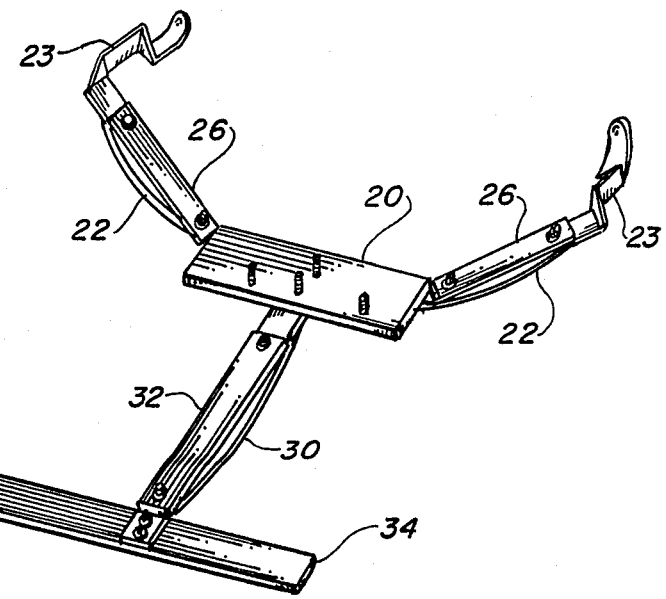
FIG. 3 is a partial isometric view of the preferred embodiment removed from the vehicle and viewed from the underside as in its normal mounting plane.
Figure 4:
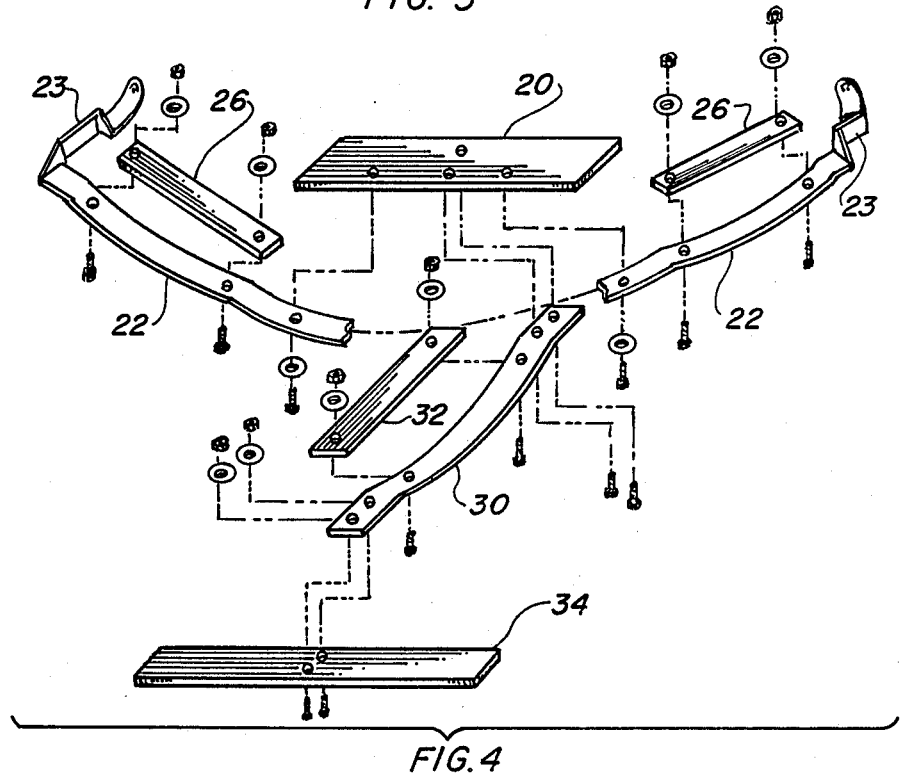
FIG. 4 is an exploded view of the vehicle stabilizer including the mounting hardware.

An outrigger spring 22 is attached rigidly to the center of the bracket 20 and extends at opposite sides with a forward angle of from between 60 and 65 degrees. The extended end is free to move in a vertical direction while absorbing the thrust load of the weight of the vehicle when tilted on its side. The spring 22 has at least 2 holes 24 in the middle allowing attachment to the bracket 20 with threaded fasteners. The spring 22 is formed preferably in one piece as illustrated in FIG. 3 and is basically a vee shape with each end bent to form a folded runner section 23. This section is folded in such a manner as to change the horizontal plane of the spring to a vertical plane and back to horizontal with each end section flat forming a runner with the ends turned upwardly. The angle of the runners is parallel to the ends of each front and rear axle of the vehicle in the front wheel straight forward position. This angle allows the turned up ends to be positioned in a forward direction when in contact with the ground. The one piece spring 22 is folded by heating, spring steel, bending when maliable and heat treating after working allowing the shape to be drawn or forged including folding continuously thereupon and then restoring the resilient nature of the spring by tempering the steel.

This spring steel is the preferred material having a shape of a bow on each extended side allowing snubbing for controlled deflection. The radial configuration also allows the vertical height to be adjusted to suit the individual ATV upon which the invention is installed.

This snubbing is accomplished by the use of a side stabilizer arm 26 juxtapositioned above each side of the spring 22. The arm 26 is attached to the spring 22 with a threaded fastener through both elements, one at the end that is extended, and the other simultaneously through the spring 22 and arm 26 at a point halfway between the other end of the arm nearest the vehicle and the attached center of the spring 22. This allows free movement for the first portion of the deflection but limits the travel when the optimum amount of movement is achieved. This arrangement provides a soft outrigger objects, such as rocks or irregular surfaces but becomes rigid when the strength is needed or when the balance point of the vehicle becomes critical.

Figure 5:
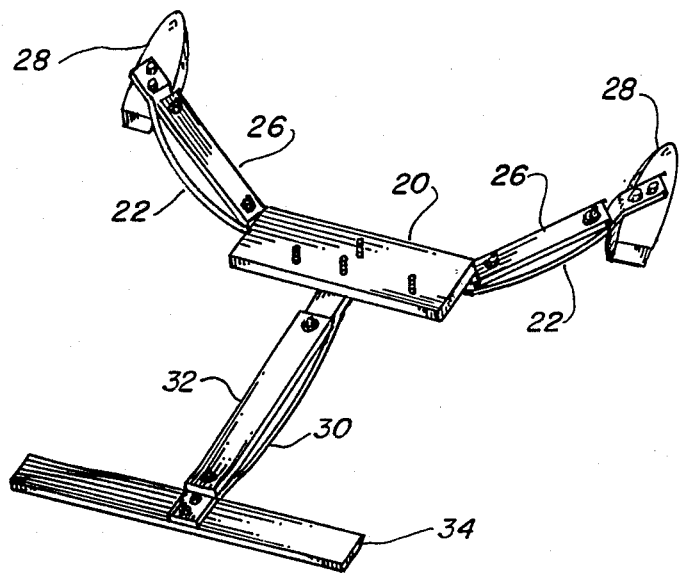
FIG. 5 is a partial isometric view of the second embodiment removed from the vehicle and viewed from the underside as in its normal mounting plane.
Figure 6:
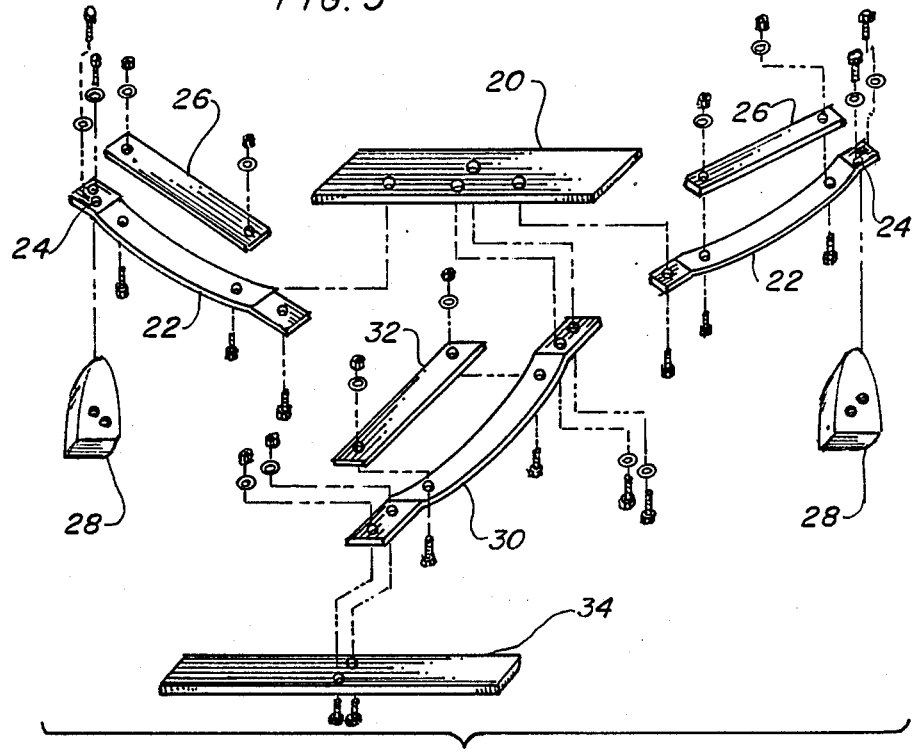
FIG. 6 is an exploded view of the second embodiment of the vehicle stabilizer, removed from the vehicle, including the mounting hardware.

The second embodiment is like the first except the outrigger spring 22a is in two separate pieces as shown in FIGS. 5 and 6. The attachment to the mounting bracket 20 is basically the same only a pair of mounting hardware are utilized on each end. The extended end serves the same function however, the folded runner section is replaced by a separate foot 28. It will be seen that the second embodiment differs in the number of components and yet the function and relative position remains unchanged.

Each outrigger foot 28 is attached to the extending end of the spring 22a. This foot is shaped to have an upturned, sharp, forward end, much like that of a boat hull. The upward taper allows riding over hazardous barriers and yet has sufficient surface to provide a large footprint to distribute the force when all of the weight of the vehicle is placed on just one of the feet 28.

It will be noted that both the preferred and second embodiments are directed to the three-wheeled ATV's as the outrigger springs and arms are strategically positioned.

The third embodiment, shown in FIGS. 1 through 4, adds a rear stabilizing arm that is also used in conjunction with the first and second embodiment, but may be employed separately in the four-wheeled vehicle configuration.

A rear spring 30 is employed that is configured much like that of the single outrigger spring 22a, except it is slightly longer. The attachment to the mounting bracket 20 is again similar using threaded fasteners directly to the vehicles undercarriage. A rear stabilizer arm 32 is employed using the same proportions as that of the side arms 26 and accomplishes the same result. Instead of a folded runner section or a foot at the end of the spring 30, a cross bar 34 is attached at right angles to the spring. This cross bar has a rounded front end that is radiused upward, so as to ride over obstructions. The length of the cross bar may vary according to the width of the ATV but certainly not beyond the envelope of the rear wheels. This width however is sufficient to provide an enlarged footprint dispersing the weight to a large area sufficient that overturning is prevented even on soft ground. The cross bar 34 may be of any material suitable for the application, with aluminum or steel being preferred. The shape may be solid, as illustrated in FIG. 1, or may be in channel shape, with other configurations acceptable, such as a flat plate bent upward at the front, etc. The length of the entire rear extending member is critical, as well as the outrigger, as their location shifts the center of gravity to a point preventing overturning and yet allowing free movement when required. The rear member obviously eliminates overturning when the front wheel or wheels are lifted from the ground. All of the vehicles have sufficient power to easily accomplish front end lifting due to the gear ratio combined with the traction of the lugged tries. This is particularly important on a grade where this rear member becomes the key element in the stability of the vehicle.

While a runner section 23, a foot 28 and cross bar 34 are presented and illustrated, this in no way limits the invention to their use exclusively as wheels, rollers, etc. will function equally well.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

I claim:

1. An all terrain wheeled vehicle stabilizer for preventing the vehicle from overturning comprising:
   (a) a mounting bracket transverse of said vehicles longitudinal centerline, extending the undercarriage of the vehicle to either side, having sufficient structural integrity to support the vehicle when bearing upon either extended side;

(b) an outrigger spring in a vee shape having forwardly angled extending ends from each opposite side of said vehicle, said spring attached to said mounting bracket allowing the extended ends to be free to move in a controlled vertical direction relative to the vehicle while yieldingly absorbing the thrust load of the weight of the vehicle if a position is encountered threatening the overturn of the vehicle on its side, also allowing sufficient vertical movement to prevent obstruction of the vehicle if an obstacle is encountered during controlled operation;

(c) a pair of side stabilizer arms having a length less than that of said spring extended end, the arms having attachment means to connect to said spring extending ends, the arms are further juxtapositioned thereabove for snubbing the amount of movement of the spring; and, (d) a folded runner section integrally formed into said spring on each extended end configured to have each end section flat with the ends turned upwardly, so as to ride over constricting hazardous barriers, and yet have sufficient surface area to prevent said vehicle from overturning when vehicle balance is lost and all of the weight of the vehicle is placed on one of the folded runner sections.

2. The vehicle stabilizer as recited in claim 1 wherein said outrigger spring is positioned outwardly on each side between 60 and 65 degrees from a plane of symmetry along the longitudinal axis of the vehicle.

3. The vehicle stabilizer as recited in claim 1 where said attachment means to connect said arms to the spring comprise a fastener through the extended end of said spring and through said arm near one end and a fastener simultaneously through both spring and arm at a point halfway between the other end of the arm and the extended end of the spring allowing limited movement of the spring when deflection is such that the balance point of the vehicle would prevent a rollover from occuring.

4. An all terrain wheeled vehicle stabilizer for preventing the vehicle from overturning comprising:

(a) a mounting bracket transverse of said vehicles longitudinal centerline, extending the undercarriage of the vehicle to either side, having sufficient structural integrity to support the vehicle when bearing upon either extended side;

(b) A pair of outrigger springs, having a first and second end, each extending from an opposite side of said vehicle at a forward angle, said first end attached to said mounting bracket allowing the extended second end to be free to move in a controlled vertical direction relative to the vehicle while yieldingly absorbing the thrust load of the weight of the vehicle if a position is encountered threatening the overturn of the vehicle on its side, also allowing sufficient vertical movement to prevent obstruction of the vehicle if an obstacle is encountered during controlled operation;

(c) a pair of side stabilizer arms having a length less than that of said spring, the arms having attachment means to connect to said springs, the arms are further juxtapositioned above said springs, thereby snubbing the amount of movement of the spring; and, (d) a pair of outrigger feet fastened upon the second end of said springs configured to have a boat-like front end tapering upward, so as to ride over constricting hazardous barriers, and yet have sufficient surface area to prevent said vehicle from overturning when vehicle balance is lost and all of the weight of the vehicle is placed on one of the feet.

5. The vehicle stabilizer as recited in claim 4 wherein said outrigger springs are positioned outward between 60 and 65 degrees from a plane of symmetry along the longitudinal axis of the vehicle.

6. The vehicle stabilizer as recited in claim 4 where said attachment means to connect said arms to the springs comprise a fastener through the second end of said spring and through said arm near one end and a fastener simultaneously through both spring and arm at a point halfway between the other end of the arm and the first end of the spring allowing limited movement of the spring when deflection is such that the balance point of the vehicle would prevent a rollover from occuring.

7. An all terrain wheeled vehicle stabilizer for preventing the vehicle from overturning comprising;

(a) a mounting bracket transverse of said vehicles longitudinal centerline, extending the undercarriage of the vehicle to either side, having sufficient structural integrity to support the vehicle when bearing upon either extended side;

(b) a rear spring, having a first and second end, extending from the back of said vehicle wheels, said first end attached to said mounting bracket allowing the extended second end to be free to move in a controlled vertical direction relative to the vehicle while yieldingly absorbing the thrust load of the weight of the vehicle if a position is encountered threatening the overturn of the vehicle from its back, also allowing sufficient vertical movement to prevent obstruction of the vehicle if an obstacle is encountered during controlled operation;

(c) a rear stabilizer arm having a length less than that of said spring, the arm having attachment means to connect to said spring, the arm is further juxtapositioned above said spring, thereby snubbing the amount of movement of the spring; and, (d) a cross bar fastened upon the second end of said spring configured to have a rounded front end radiused upward so as to ride over constricting hazardous barriers, and yet have sufficient surface area to prevent said vehicle from overturning when vehicle balance is lost and all of the weight of the vehicle is placed on the bar.

8. An all terrain wheeled vehicle stabilizer for preventing the vehicle from overturning comprising:

(a) a mounting bracket transverse of said vehicles longitudinal centerline, extending the undercarriage of the vehicle to either side, having sufficient structural integrity to support the vehicle when bearing upon either extended side;

(b) an outrigger spring in a vee shape having forwardly angled extending ends from each opposite side of said vehicle, said spring attached to said mounting bracket allowing the extended ends to be free to move in a controlled vertical direction relative to the vehicle while yieldingly absorbing the thrust load of the weight of the vehicle if a position is encountered threatening the overturn of the vehicle on its side, also allowing sufficient vertical movement to prevent obstruction of the vehicle if an obstacle is encountered during controlled operation;

(c) a pair of side stabilizer arms having a length less than that of said spring extended end, the arms having attachment means to connect to said spring extending ends, the arms are further juxtapositioned thereabove for snubbing the amount of movement of the spring;

(d) a folded runner section integrally formed into said spring on each extended end configured to have each end section flat with the ends turned upwardly, so as to ride over constricting hazardous barriers, and yet have sufficient surface area to prevent said vehicle from overturning when vehicle balance is lost and all of the weight of the vehicle is placed on one of the folded runner sections;

(e) a rear spring, having a first and second end, extending from the back of said vehicle wheels, said first end attached to said mounting bracket allowing the extended second end to be free to move in a controlled vertical direction relative to the vehicle while yieldingly absorbing the thrust load of the weight of the vehicle if a position is encountered threatening the overturn of the vehicle from its back, also allowing sufficient vertical movement to prevent obstruction of the vehicle is an obstacle is encountered during controlled operation;

(f) a rear stabilizer arm having a length less than that of said rear spring, the arm having attachment means to connect to said spring, the arm is further juxtapositioned above said spring, thereby snubbing the amount of movement of the spring; and, (g) a cross bar fastened upon the second end of said spring having rounded front end radiused upward so as to ride over constricting hazardous barriers, and yet have sufficient surface area to prevent said vehicle from overturning when vehicle balance is lost and all of the weight of the vehicle is placed on the bar.

9. The vehicle stabilizer as recited in claim 8 wherein said outrigger springs are positioned outward between 60 and 65 degrees from a plane of symmetry along the longitudinal axis of the vehicle.

10. The vehicle stabilizer as recited in claim 8 where said attachment means to connect said arms to the springs comprise a fastener through the second end of said spring and through said arm near one end and a fastener simultaneously through both spring and arm at a point halfway between the other end of the arm and the first end of the spring allowing limited movement of the spring when deflection is such that the balance point of the vehicle would prevent a rollover from occuring.

* * * * *